(12) United States Patent
Kannan et al.

(10) Patent No.: US 10,592,806 B1
(45) Date of Patent: Mar. 17, 2020

(54) MANAGEMENT OF THE EXECUTION OF COLLABORATIVE PROJECTS

(71) Applicant: Massachusetts Mutual Life Insurance Company, Springfield, MA (US)

(72) Inventors: Gopika Kannan, West Hartford, CT (US); Jennifer Fabrizi, Amherst, MA (US); Robert Polkowski, Boston, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 1280 days.

(21) Appl. No.: 14/572,397

(22) Filed: Dec. 16, 2014

Related U.S. Application Data

(60) Provisional application No. 61/919,220, filed on Dec. 20, 2013.

(51) Int. Cl.
  *G06N 5/00* (2006.01)
  *G06N 5/02* (2006.01)
  *G06F 16/248* (2019.01)

(52) U.S. Cl.
  CPC ............. *G06N 5/02* (2013.01); *G06F 16/248* (2019.01)

(58) Field of Classification Search
  CPC ....................................................... G06N 5/02
  USPC .......................................................... 706/11
  See application file for complete search history.

(56) References Cited

U.S. PATENT DOCUMENTS

| | | | | |
|---|---|---|---|---|
| 7,577,909 B2* | 8/2009 | Harriger | ............... | G06F 9/4443 715/738 |
| 7,577,916 B2* | 8/2009 | Pedersen | ................. | G06F 3/011 715/235 |
| 8,819,617 B1* | 8/2014 | Koenig | ..................... | G06F 8/70 717/101 |
| 2001/0054032 A1 | 12/2001 | Goldman et al. | | |
| 2004/0006566 A1 | 1/2004 | Taylor et al. | | |
| 2004/0111705 A1* | 6/2004 | Motoyama | ................ | G06F 8/10 717/126 |
| 2004/0143583 A1* | 7/2004 | Poole | ..................... | G06F 9/4443 |
| 2006/0155562 A1* | 7/2006 | Kano | ..................... | G06Q 10/04 705/7.37 |
| 2007/0136429 A1 | 6/2007 | Fine et al. | | |
| 2007/0162316 A1* | 7/2007 | Kratschmer | ........... | G06Q 10/06 705/7.22 |

(Continued)

*Primary Examiner* — Hien D Khuu
(74) *Attorney, Agent, or Firm* — Eric L. Sophir; Dentons US LLP

(57) ABSTRACT

The present disclosure describes a system including a knowledge ecosystem of use in managing the execution of collaborative projects. In systems disclosed here, participants may receive suggested knowledge of use in one or more tasks related to their role in one or more projects. In systems disclosed here, participants in a knowledge ecosystem may be described using attributes, where the system may modify a set of attributes associated with a participant. The system may suggest one or more participants for one or more tasks in a project as well as collaboration with one or more other people with knowledge relevant to the project. Systems disclosed here may manage the execution of collaborative projects, where managing the execution may include characterizing knowledge and participants in an ecosystem, suggesting collaboration between participants in the ecosystem, and presenting relevant information in a timely manner to participants in the project.

18 Claims, 5 Drawing Sheets

(56) References Cited

U.S. PATENT DOCUMENTS

| | | | |
|---|---|---|---|
| 2007/0185873 A1* | 8/2007 | Muller | G06Q 10/10 |
| 2007/0271521 A1* | 11/2007 | Harriger | G06F 9/4443 |
| | | | 715/762 |
| 2008/0059942 A1* | 3/2008 | Brown | G06F 8/24 |
| | | | 717/101 |
| 2008/0059977 A1* | 3/2008 | Brown | G06F 8/71 |
| | | | 719/316 |
| 2008/0120129 A1* | 5/2008 | Seubert | G06Q 10/06 |
| | | | 705/35 |
| 2008/0270210 A1* | 10/2008 | Kratschmer | G06Q 10/06 |
| | | | 705/7.28 |
| 2008/0301105 A1 | 12/2008 | Chen et al. | |
| 2009/0037912 A1* | 2/2009 | Stoitsev | G06F 9/45512 |
| | | | 718/100 |
| 2009/0112916 A1* | 4/2009 | Stuhec | G06F 17/2247 |
| 2009/0164267 A1* | 6/2009 | Banatwala | G06F 17/30997 |
| | | | 707/736 |
| 2009/0234686 A1* | 9/2009 | Chakra | G06Q 10/06 |
| | | | 705/325 |
| 2009/0307129 A1 | 12/2009 | Matkowsky et al. | |
| 2010/0088139 A1* | 4/2010 | Rahi | G06Q 10/06 |
| | | | 705/7.36 |
| 2010/0174577 A1* | 7/2010 | Duffy | G06Q 10/063112 |
| | | | 705/7.14 |
| 2010/0325214 A1 | 12/2010 | Gupta | |
| 2011/0082824 A1* | 4/2011 | Allison | G06N 99/005 |
| | | | 706/20 |
| 2012/0016701 A1* | 1/2012 | Narendra | G06Q 10/06 |
| | | | 705/7.11 |
| 2012/0053978 A1* | 3/2012 | Andersen | G06Q 10/06 |
| | | | 705/7.14 |
| 2012/0116834 A1* | 5/2012 | Pope | G06Q 10/06316 |
| | | | 705/7.26 |
| 2013/0007036 A1 | 1/2013 | Childs et al. | |
| 2013/0086495 A1 | 4/2013 | Guzansky et al. | |
| 2013/0091456 A1 | 4/2013 | Sherman et al. | |
| 2013/0110641 A1 | 5/2013 | Ormont et al. | |
| 2013/0149681 A1* | 6/2013 | Tinkler | G09B 7/04 |
| | | | 434/167 |
| 2014/0075004 A1* | 3/2014 | Van Dusen | H04L 41/04 |
| | | | 709/223 |
| 2014/0280314 A1* | 9/2014 | Coleman | G06F 17/30587 |
| | | | 707/769 |
| 2015/0025928 A1* | 1/2015 | Kang | G06Q 10/06311 |
| | | | 705/7.14 |
| 2016/0267188 A1* | 9/2016 | Spaulding | G06F 16/24578 |

* cited by examiner

300

US 10,592,806 B1

MANAGEMENT OF THE EXECUTION OF COLLABORATIVE PROJECTS

CROSS-REFERENCE TO RELATED APPLICATIONS

This application claims priority to U.S. Provisional Patent Application Ser. No. 61/919,220, entitled "Management of the Execution of Collaborative Projects," filed Dec. 20, 2013, which is hereby incorporated by reference in its entirety.

TECHNICAL FIELD

The present disclosure relates in general to project management systems, and more specifically to systems for managing the execution of projects.

BACKGROUND

Projects typically involve the activities of many, often technically diverse, business groups. Such projects may often be marked by failure to meet one or more of various project objectives, including keeping the project below the desired costs and keeping with time schedules. Several factors may contribute to the failure to meet overall project objectives, as project responsibilities may be subdivided among separate operating groups, each of which has responsibility for one or more aspects of the project.

Variation in the objectives and/or strategies of a particular group during the project may additionally affect the ability of one or more other groups to reach their objectives. The failure to communicate these and other developments between individual groups can have a ripple affect on other groups which, if discovered too late in the project, may contribute to the failure of one or more of the groups in meeting their objectives.

Similarly, while a cost overrun may result in a particular group meeting the majority of their stated objectives within an acceptable variance, the cumulative affect of these variances may result in an unexpected failure to meet overall objectives. For example, each group might meet all of its objectives except for cost, resulting in an unacceptable overrun on the entire project.

These and other problems underscore a need for improved, intelligent project management system.

SUMMARY

The present disclosure describes a system for managing the execution of one or more collaborative projects, where the system includes a knowledge ecosystem.

In one embodiment, a computer-implemented method comprises automatically associating, by the computer, a set of one or more artifact attributes with at least a portion of a new artifact when the new artifact is stored in a database; comparing, by the computer, the set of artifact attributes against a set of one or more task attributes associated with a task, wherein the task is related to a project; comparing, by the computer, the set of artifact attributes against a set of one or more project team attributes that are associated with a project team working on the project; providing, by the computer, to a user interface a set of one or more suggested artifacts based on the comparisons, wherein each of the suggested artifacts is at least a portion of an artifact associated with a set of artifact attributes matching one or more task attributes and matching one or more project team attributes.

In another embodiment, a computer-implemented method comprises automatically associating, by the computer, a set of one or more participant attributes with a new participant when the new participant is entered into a database; comparing, by the computer, the set of participant attributes against a set of one or more task attributes associated with a task, wherein the task is related to a project; comparing, by the computer, the set of participant attributes against a set of one or more project team attributes that are associated with a project team working on the project; suggesting, by the computer, to a user interface a set of one or more suggested participants based on the comparisons, wherein each of the suggested participant is a participant associated with a set of participant attributes matching one or more task attributes and matching one or more project team attributes.

In still another embodiment, a system comprises a knowledge base storing one or more artifacts associated with one or more knowledge attributes; and a knowledge processor monitoring a user interface of a knowledge system and configured to suggest one or more artifacts for a task related to a project and at least one user based on an action detected on the user interface.

The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

Numerous other aspects, features and benefits of the present disclosure may be made apparent from the following detailed description.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
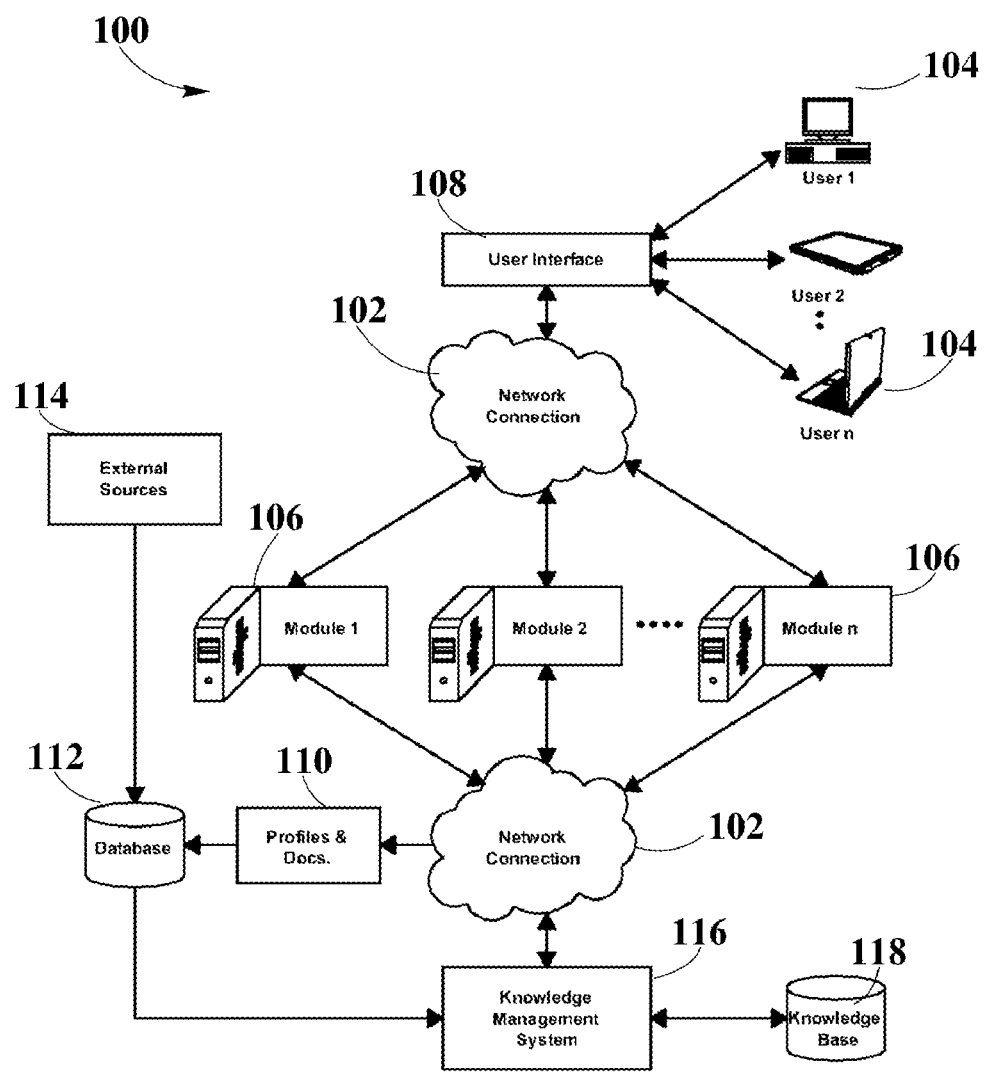
FIG. 1 shows a system architecture for a knowledge ecosystem, according to one or more embodiments.

As used here, the following terms may have the following definitions:

"Knowledge" refers to information, acquired or derived by one or more participants in one or more projects for use in one or more other projects.

"Knowledge Management" refers to the process of acquiring, organizing, storing, sharing and using knowledge by organizations or individuals.

"Knowledge Map" refers to a diagram used for visualizing flow of knowledge and duties before, during and after a project execution.

"Knowledge Ecosystem" refers to people creating knowledge through networks of collaboration that may be supported by a technology network of knowledge bases and communication links.

"Knowledge Content" refers to the work output produced by the members of a knowledge ecosystem, where this content may have a life cycle that matures from tribal knowledge to conventional wisdom through the structure of the ecosystem. Knowledge content may be in the form of a piece of documentation such as memos, notes, emails, directories, articles, white papers, and case studies, among others, where this documentation may be relevant to execute tasks of interest within an organization.

"Knowledge Base" refers to a collection of knowledge content saved in an electronic storage system and that may be later retrieved for implementation in future projects.

"Knowledge Based Assignment Module" refers to a module which may be part of a knowledge ecosystem which is responsible to gather necessary information to perform an optimal assignment of a set of employees to a set of projects.

"Artifact" refers to any instance of a template including information of use in one or more projects. Types of artifacts may include project deliverables, project groundwork, and reference documents. Project deliverables may include documents which may be created and provided as a result of the completion of one or more stages of a project such as business requirements, test plans, test cases, project charter, and project scope. Project groundwork may include documents created to support the analysis during project execution, including diagrams, spreadsheets and questionnaires, among others. Reference documents may describe suitable approaches for implementing one or more artifacts according to the knowledge required by the project.

"Attribute" refers to one or more characteristics that describe one or more aspects of an object, project, document, or participant.

"Object" refers to any commodity with a non-trivial role in a project.

"Participant" refers to any person with a non-trivial role in a project.

DETAILED DESCRIPTION

The present disclosure is herein described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The exemplary embodiments described herein are directed to improving the efficiency of processing knowledge information. The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

The embodiments describe systems and methods for managing the execution of one or more collaborative projects. That is, a system for managing the execution of projects, where the system is a project management system including a knowledge ecosystem.

In the exemplary embodiments, knowledge may be described as an artifact or a portion of an artifact having one or more suitable attributes. Suitable attributes may include any quantifiable or qualifiable attributes, including relevance to one or more subject matters, degree of creativity, legal requirements, frequency of use, ratings, related objects, and time-relevance, amongst others. In one or more embodiments, the project management system may automatically associate one or more attributes with one or more artifacts or portions of artifacts using any suitable method. In one or more embodiments, knowledge may be stored and managed in one or more suitable knowledge bases.

Participants may receive suggested knowledge that may be of use in one or more tasks related to their role in one or more projects. The system may suggested related artifacts automatically when a user performs a suitable action. In one or more embodiments, users may be presented with one or more portions of an artifact relevant to one or more tasks being undertaken.

In one or more embodiments, knowledge may be presented to a single user, a group of users, a subset of a group of users, or any suitable combination. The knowledge presented may additionally depend on suitable attributes of one or more projects, including size (e.g., team size), budget or investment, the business capability the project is intended to enhance or enable, skill levels needed for the project's success, and types of risk associated with the project, amongst others.

Participants in a knowledge ecosystem may be described using any number of suitable attributes, where the system may modify a set of attributes associated with a participant as the participant performs a suitable action.

One or more participants for one or more tasks in a project, where the system may suggest the one or more participants based on the attributes associated with said one or more participants or the desired future attributes of said one or more participants. In one or more embodiments, as a participant undertakes a task, the system may suggest collaboration with one or more other people, having a desired set of attributes, at a desired point in time.

Exemplary systems and methods may be used to manage the execution of collaborative projects, where managing the execution may include characterizing knowledge and participants in an ecosystem, suggesting collaboration between participants in the ecosystem, and presenting relevant information in a timely manner to participants in the project.

Knowledge Ecosystem

FIG. 1 shows a system architecture 100 for a knowledge ecosystem in which one or more embodiments of the present disclosure may operate. The knowledge ecosystem described here may enable automated human-to-human collaboration through the use of system architecture 100. The disclosed system architecture 100 may include different components which may dynamically interact with each other through network connections 102. Network connections 102 may refer to any suitable connections between computers such as, for example, intranets, local area networks (LAN), virtual private networks (VPN), wireless area networks (WAN) and the internet, amongst others.

In the knowledge ecosystem, one or more client computing devices 104 may display a graphical user interface 108 configured to receive information from one or more users and interact with one or more software modules 106. Examples of client computing devices 104 may include smartphones, desktop computers, laptop computers, tablets, and PDAs, among others. Software modules 106 may include any software used by key areas of an organization such as, for example, accounting software, human resources software, project management, organizational social networks, search engines and/or any other suitable software from where knowledge of an organization may be derived. In addition, each software module 106 may be executed by a server, a single computer or multiple computers in a distributed configuration.

User interface 108 displayed in client computing devices 104 may exhibit an intelligent feature for not only supporting human-computer interactions but also providing technology supported and socially enabled human-to-human collaboration for co-located and geographically diverse work teams alike. User interface 108 may act as a single portal for accessing different software modules 106 and may be tailored to users depending on the access rights predetermined for those specific users. In another embodiment, an independent user interface 108 may exist for each software module 106.

Interaction between client computing devices 104 and software modules 106 may generate raw data 110 such as user profiles, documents, project information, metrics, emails and worksheets among others. Software modules 106 may transmit raw data 110 through network connection 102 to a database 112 for storing. Database 112 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

External sources 114 may also feed raw data 110 to database 112. Examples of external sources 114 may include the world wide web, external social networks, external consulting, third party providers, external project sources and/or any external data that may serve to produce knowledge.

Finally, a knowledge management system 116 may manage and process the flow of information within the knowledge ecosystem. For example, knowledge management system 116 may retrieve and process raw data 110 stored in database 112 to consequently derive knowledge from raw data 110. Knowledge may then be stored in a knowledge base 118. Knowledge management system 116 may also pull knowledge from knowledge base 118 when requested by client computing devices 104 or software modules 106.

Knowledge management system 116 may include one or more computers suitable for executing knowledge management software according to embodiments described here. Knowledge base 118 may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

Figure 2:
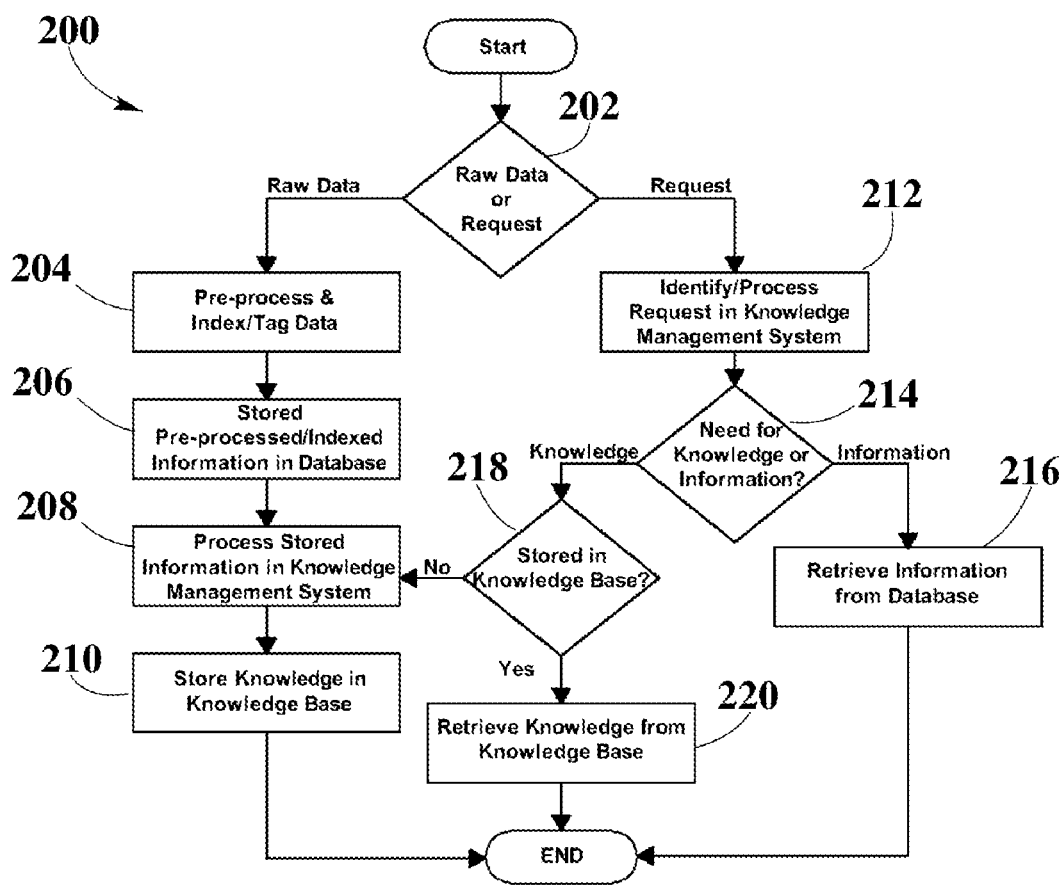
FIG. 2 is a flowchart of input/request management process, according to an embodiment.

FIG. 2 is a flowchart of input/request management process 200, according to an embodiment.

The process may start when raw data or requests may be generated from the interaction of one or more client computing devices with one or more software modules within a knowledge ecosystem.

Examples of client computing devices may include smartphones, desktop computers, laptop computers, tablets, and PDAs, among others. Software modules may include any software used by key areas of an organization such as, for example, accounting software, human resources software, organizational social networks, project management, search engines and/or any other suitable software from where knowledge of an organization may be derived. In addition, each software module may be executed by a server, a single computer or multiple computers in a distributed configuration.

Raw data may include user profiles, documents, project information, metrics, emails and worksheets, among others. Requests may include the demand for information or knowledge.

Software modules may classify between raw data or requests, at step 202.

Subsequently, at step 204, software modules may send raw data to a database where one or more sets of raw data may be analyzed, classified, indexed, and tagged using one or more information processing algorithms designed to process one or more types of data, allowing the conversion of raw data into preprocessed information.

In some embodiments, this process may be done using state of the art data mining, and other suitable data processing tools. The database may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

The database may store the preprocessed information at step 206, until a knowledge management system determines that there is a need for analyzing one or more sets of preprocessed information. Knowledge management system may include one or more computers suitable for executing knowledge management software according to embodiments described here.

The need for analyzing one or more sets of preprocessed information may arise from a client computing device generated request or from a software module generated request.

If the knowledge management system determines there is a need for new knowledge within the knowledge ecosystem, knowledge management system may analyze one or more sets of preprocessed information according to the identified knowledge needs, at step 208. In some embodiments, knowledge management system may use additional processing tools from one or more software modules during the analysis of preprocessed information.

Following step 208, knowledge management system may analyze and compare one or more sets of processed information against one or more knowledge needs identified within the knowledge ecosystem. Knowledge management system may identify knowledge from the processed information, where this knowledge may be useful for improving the performance of one or more tasks in a project. At step 210, the knowledge management system may store the identified knowledge in a knowledge base and the process may end. In some other embodiments, knowledge management system may store only indexed references or tags of the one or more useful processed information sets or subsets in knowledge base.

Knowledge base may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data.

At step 202, software modules may send requests to the knowledge management system for analysis, at step 212. Knowledge management system may classify the requests to determine if there is a need for knowledge or for information, at step 214. In one embodiment, information may refer to facts or details about users, tasks, projects, and general activities within the knowledge ecosystem. In one embodiment, knowledge may refer to information, acquired, processed or derived by client computing devices, software modules, and knowledge management system, where this information may be useful for improving one or more tasks in one or more projects.

Following the process, if there is a need for information, knowledge management system may retrieve the necessary one or more sets or subsets of information from the database, at step 216, and the process may end.

If there is a need for knowledge, knowledge management system may determine if the necessary knowledge to address the identified need is already stored in the knowledge base, at step 218. If the necessary knowledge is already stored in the knowledge base, then knowledge management system may retrieve the required knowledge from the knowledge base, at step 220. If necessary knowledge is not yet stored in the knowledge base, knowledge management system may retrieve and analyze one or more sets of preprocessed data from the database and subsequently store identified knowledge in knowledge base, at step 210, and the process may end.

Knowledge Categorization

In one or more embodiments, a knowledge management system may describe knowledge in a knowledge ecosystem as an artifact having one or more suitable attributes. Suitable attributes may include any quantifiable or qualifiable attributes, including relevance to one or more subject matters, degree of creativity, legal requirements, frequency of use, ratings, related objects, and time-relevance, amongst others.

In one or more embodiments, a knowledge management system may automatically associate one or more attributes with one or more artifacts using any suitable method. Suitable methods may include the use of Natural Language Processing (NLP), where the system may process one or more portions of an artifact using one or more suitable statistical models for each of a plurality of types of attributes. The system may additionally generate one or more vector representations describing the one or more attributes of the one or more artifacts.

In one or more embodiments, the system may describe each of one or more portions of one or more artifacts using one or more suitable attributes, where said one or more portions may each be described by a set of attributes that may differ between portions.

Knowledge Suggestion

In one or more embodiments, a project management system may suggest knowledge to participants in a project that may be of use in one or more tasks related to their role in one or more projects. The system may suggest related artifacts automatically as a user begins a task, or may present suggestions when a user performs a suitable action on an intelligent user interface. Suitable actions may include clicking a button on a graphical user interface, clicking on a physical button, or performing a gesture on a touchscreen interface, amongst others.

In one or more embodiments, the system may present users with a complete artifact. In one or more other embodiments, the system may present users one or more suitable portions of the artifact. Suitable portions may include any portion including information relevant to one or more tasks the user may undertake in the project. The relevance of the one or more portions may be determined by the system using any suitable method using any suitable number of attributes.

In one or more embodiments, the system may represent one or more knowledge attributes using a vector representation of the one or more knowledge attributes, and the system may then determine the relevance of the one or more portions by comparing a vector describing the portion to a vector describing one or more aspects of the task.

Participant Characterization

In one or more embodiments, a project management system may describe participants in a knowledge ecosystem using any number of suitable attributes. Suitable attributes may include any quantifiable or qualifiable attributes, including experience with a type of project, academic background, availability, knowledge the participant has created using the system, or knowledge the participant has accessed using the system, amongst others.

In one or more embodiments, a project management system may modify a set of attributes associated with a participant as the participant performs a suitable action. Suitable actions may include collaboration in projects, execution of tasks in a project, exposure to knowledge in the system, and generation of knowledge in the system, amongst others.

Participant Suggestion & Collaboration

In one or more embodiments, a project management system may suggest one or more participants for one or more tasks in a project. A knowledge management system may suggest the one or more participants based on the attributes associated with said one or more participants. Alternatively, the knowledge management system may include information about the desired future attributes of a participant and may suggest their participation in one or more tasks in the project accordingly.

Suitable attributes may include analytical skills and creativity, as well as psychographic information. Psychographic attributes may include attitude, motivation, and influence over co-workers, amongst others. Suitable attributes may also describe the behavior of participants in previous projects, including behaviors such as the behavior when receiving criticism, the method employed to manage conflict and risk, and the manner to obtain insight from other co-workers, among others. The system may also identify project attributes and may associate a score with each employee's attributes based on matching probabilities to specific project's attributes. In one or more embodiments, the score may range from 1 to 5. Suitable project attributes may include size (e.g., team size), budget or investment, the business capability the project is intended to enhance or enable, skill levels needed for the project's success, and types of risk the project presents, amongst others.

In one or more embodiments, as a participant undertakes a task, the system may suggest collaboration with one or more other people, having a desired set of attributes, at a desired point in time. In one or more embodiments, the system determines the desired set of attributes using a set of attributes associated with the project, a set of attributes associated with one or more tasks associated with the project, or any suitable combination.

Figure 3:
FIG. 3 is a table describing one or more participants, according to an embodiment.

FIG. 3. is a Participant Attribute Table 300. In one or more embodiments, a system performing Participant Characterization and Participant Suggestion may employ a table similar to Participant Attribute Table 300. The system may calculate a net score for the participants, which in one or more embodiments may be a summation of scores assigned to employee's attributes, where the system may use the net score to describe the suitability of a participant for a project with a desired set of attributes. The system may additionally use a score to describe the participants' availability to work on the project. Furthermore, the system may determine that each participant may have a different level of preparedness for the role the participant may play in the project. The system may then use the net score, availability and preparedness of a participant to form part of the project to calculate a total score for each participant.

In an exemplary embodiment, the system may calculate the total score as follows:

$$\text{Total score} = \text{net score} * \frac{(x * y)}{2}$$

Where x may be a factor associated with the availability of an employee, where the factor may range from 0 to 1; and y may be a factor associated with the preparedness of an employee, where the factor may range from 0 to 1.

In one or more embodiments, the system may use the total score as a rank, where the system may then classify the set of participants into one or more categories, where each category may indicate the level of potential involvement of the participants. In one or more embodiments, the system may classify the participants into three categories: a first category that may include high-potential members with high availability that may work directly on the project; a second category may include high-potential members with limited availability that may participate as their schedules allow; and a third category that may include individuals that may provide task-based support. The system may additionally include observations and recommendations of one or more other participants.

Project Execution

A project management system including a Knowledge Ecosystem may manage the execution of collaborative projects, where managing the execution includes characterizing knowledge and participants in an ecosystem. The system may then proceed to suggest collaboration between participants in the ecosystem based on the attributes of the tasks being undertaken by the participants.

In one or more embodiments, as participants carry out one or more tasks associated with a project, the system may present one or more portions of artifacts deemed to have a desired relevance. The system may determine relevance automatically using any suitable metric, including metrics that take into account one or more attributes of the artifact and/or the participant. In one or more other embodiments, the system may present the information upon a request from the participant.

Figure 4:
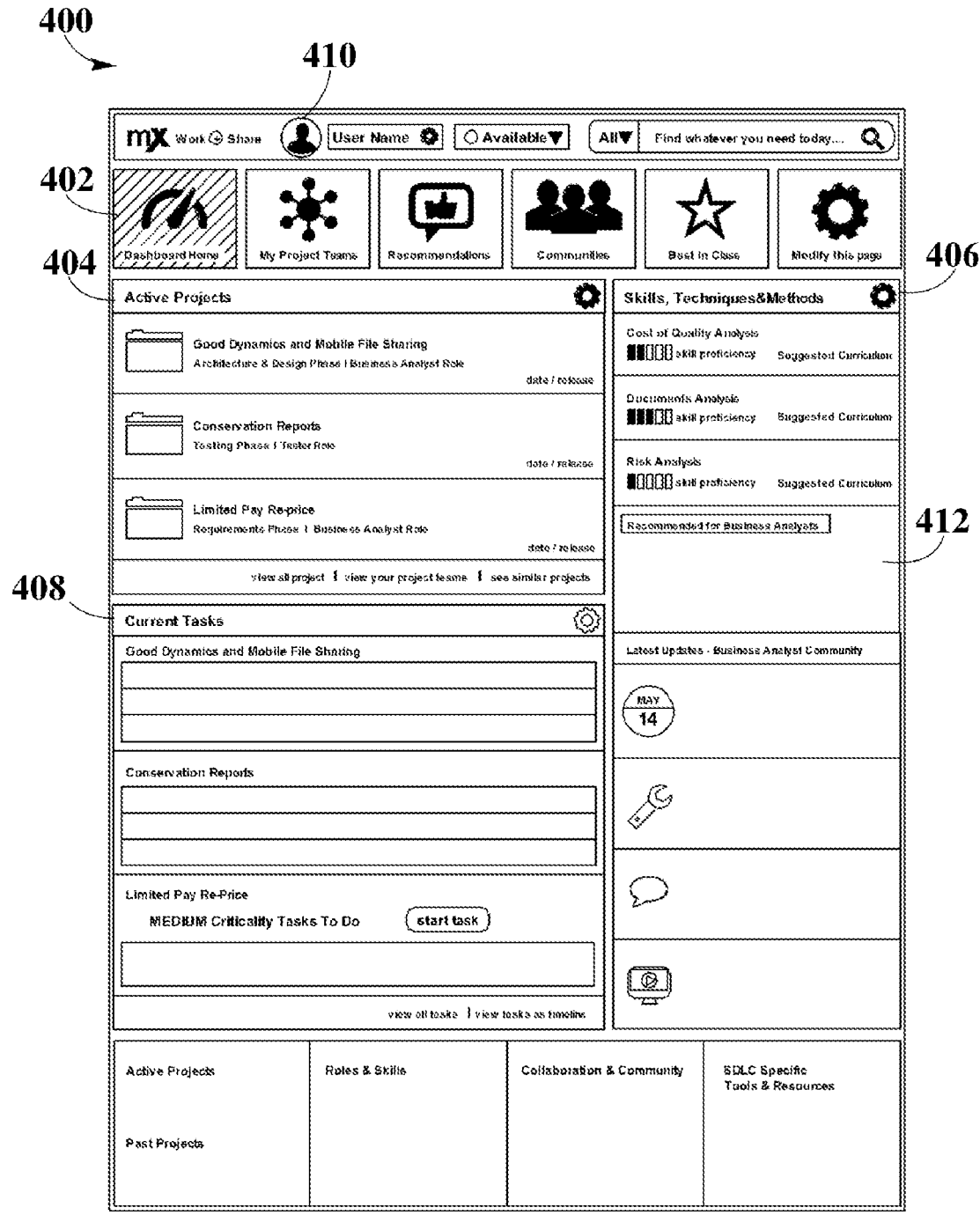
FIG. 4 illustrates a User Interface 400, according to an embodiment.

FIG. 4 illustrates an User Interface 400, according to an embodiment. User Interface 400 may be configured according to the tasks and operations performed in one or more software modules within a knowledge ecosystem. Software modules may generate User Interface 400 through suitable computing devices such as a desktop computers, workstations, and servers running any suitable operating systems and software packages. User Interface 400 may be displayed in one or more client computing devices such as smartphones, tablets, laptop computers, desktop computers, and PDAs, among others.

User Interface 400 may display a Dashboard Home 402 which may include qualitative and quantitative information about Active Projects 404, Skills and Techniques 306, and Current Tasks 408.

Active Projects 404 may include information about status, roles and project reports.

Skills and Techniques 406 may include an analysis, assessment, and ranking of the abilities of a particular member or User 410 related to a particular project. For example, User 410 may be ranked in different Skills and Techniques 406 such as cost analysis, document analysis, and risk analysis, where User 410 may rank higher in document analysis skill as depicted in FIG. 4. These rankings may be used for making suitable role Recommendation 412, as in this particular example, User 410 may be recommended for Business Analyst.

Current tasks 408 may include file sharing, reports, reviews, and status of critical tasks to do in a project.

User Interface 400 may also display other tabs related to project teams, recommendations, communities, best in class, and settings, among others.

The disclosed Skills and Techniques 406 information aforementioned may be used to as qualitative and quantitative parameters to selection for new team members into a project team.

Figure 5:
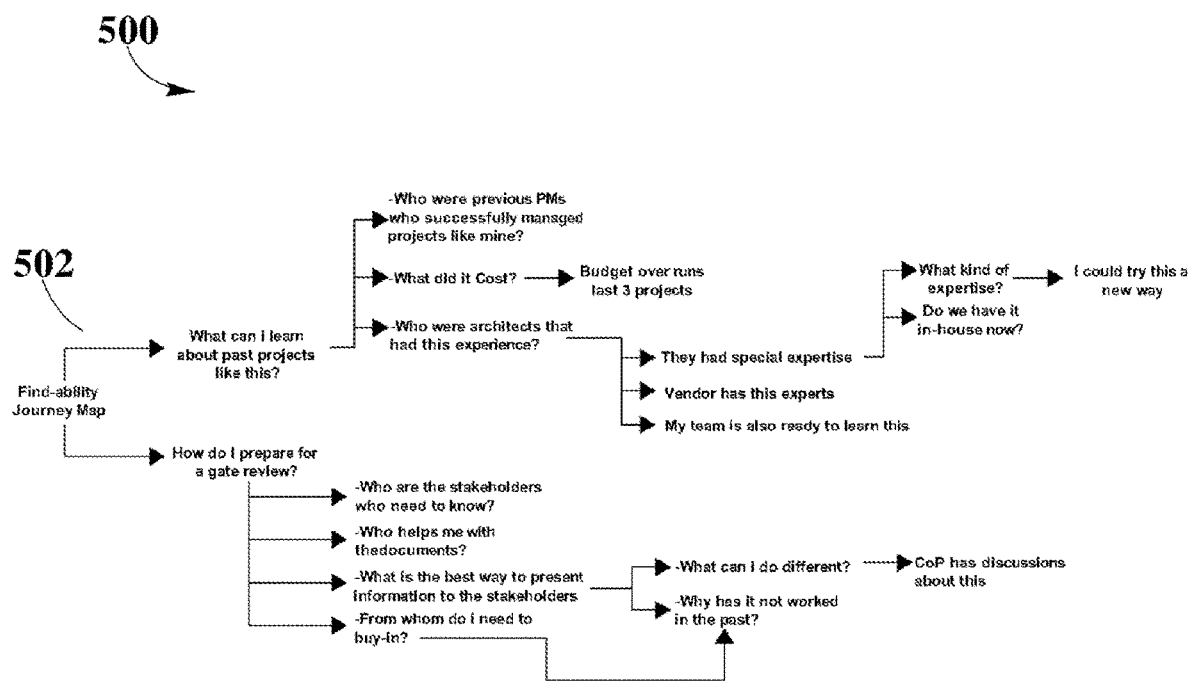
FIG. 5 shows a journey map of a process, according to one or more exemplary embodiments.

FIG. 5 shows Journey Map 500. In one or more embodiments, a user interface may allow a user to follow a Process 502 similar to that described in the figure, where the process may allow the user to find knowledge of use in one or more tasks that may be associated with one or more projects the user may be a participant of.

Example 1 is a knowledge ecosystem used to manage the execution of collaborative projects, where the ecosystem includes 4 systems: the main system, which manages collaboration between projects and manages templates, artifacts, and any other relevant documents; the test system, which manages testing processes and any related documents; a business analysis system, which manages work outputs related to business analysis; and a financial system which manages financial aspects of the projects.

In this example, the main system suggests collaboration between one or more participants in two or more projects, where the participants have attributes that may be of value in other projects or may have developed documents with attributes related to said other projects. The system may, for example, suggest that a junior engineer seek collaboration with a senior engineer having experience with projects similar to that the junior engineer will work on. In another example, a senior engineer may be presented a suggestion to collaborate with a junior engineer with a background in a newly developed technology the system has deemed may be of use in the senior engineer's project.

Additionally, the system may present information tailored to each participant in the system, taking into account their attributes to determine the granularity of the information presented when the user requests information. In this example, when an engineer with little or no business background is presented a business requirements document, terms that the system deems the engineer will likely be unfamiliar with are highlighted. When the engineer clicks on the terms, the engineer may be presented a full article explaining the meaning and the use of the term. In contrast, when a Business Analyst views the same document, the system may highlight a different set of terms, or may present a more concise explanation of the term that may serve as a reminder of the term and its usage.

Example 2 is a project management system included as a module in a knowledge ecosystem with an architecture similar to that described in FIG. 1. In this example, the project management module may retrieve information from other modules, or other suitable components in the system, to present suggestions when performing a task, including presenting suggested participants when starting a task, present knowledge with relevant information based on the task attributes and artifact attributes, and manage the availability of one or more objects and/or participants, amongst others.

Example 3 is a project management system in which a desired number of tasks are handled externally of a knowledge ecosystem. In this example, information between the project management system and the knowledge ecosystem is shared through a suitable network connection, where the information is used in the project management system when performing a task.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
   monitoring and collecting, by a server, a first set of data generated from a plurality of interactions between a plurality of users and a graphical user interface displayed on a plurality of computing devices operated by at least one user of the plurality of users;
   receiving, by the server, a second set of data from a plurality of external sources comprising at least a social networking source, wherein the second set of data corresponds to social networking interactions of at least one user of the plurality of users;
   storing, by the server, the first and the second sets of data in a database;
   tagging and indexing, by the server, the first and the second sets of data within the database to identify a set of user attributes for each user from the plurality of users;
   determining, by the server, a subset of the plurality of users by:
      comparing, by the server, the set of user attributes for each user of the plurality of users against a set of one or more task attributes associated with a task, wherein the task is related to a project,
      comparing, by the server, the set of user attributes for each user of the plurality of users against a set of one or more project team attributes that are associated with a project team working on the project, and
      selecting, by the server, the subset of users based on each user having a pre-determined attribute;
   instructing, by the server, a computing device of the plurality of computing devices to display on the graphical user interface, the subset of the plurality of users, wherein user attributes of each user of the subset of the plurality of users matches at least one attribute of associated with the task or the project team working on the project;
   generating, by the server, a new graphical user interface configured for display on a plurality of computing devices corresponding to each user within the subset of the plurality of users, the new graphical user interface comprising:
      a first graphical region displaying a status of the project,
      a second graphical region displaying one or recommended users for the project, and
      a third graphical region displaying one or more selectable graphical components representing one or more terms associated with the project, whereby when the user interacts with a selectable graphical component by clicking on the selectable graphical component, the server launches a display corresponding to a description of the one or more terms associated with the project in accordance with that user's attributes while other selectable graphical components not clicked on by the user remain unlaunched, wherein the one or more selectable graphical components are unique to each user of the subset of the plurality of users.

2. The method according to claim 1, wherein the selection of the subset of the plurality of users is based on at least one of: relevance to one or more subject matter, degree of creativity, legal requirements, frequency of use, ratings, related objects, and time-relevance.

3. The method according to claim 1, further comprising:
   detecting, by the server, the task related to the project based on raw data generated by a user interaction with the graphical user interface.

4. The method according to claim 1, further comprising:
   generating, by the server, a set of one or more vector representations associated with the one or more user attributes; and
   determining, by the server, the selection of the plurality of users according to their respective one or more vector representations.

5. The method according to claim 2, further comprising:
   automatically modifying, by the server, one or more user attributes stored in the database based on the data generated from a plurality of interactions between the plurality of users and the graphical user interface.

6. The method according to claim 2, further comprising:
   suggesting, by the server, one or more users for one or more tasks in a project based on the associated one or more pre-determined user attributes.

7. The system according to claim 6, further comprising:
   calculating, by the server, a match probability score based on a comparison of the one or more user attributes associated with a user against the one or more task attributes of the task.

8. The method according to claim 2, further comprising:
   storing, by the server, in a desired attributes database one or more desired future attributes associated with a user received from the user interface; and
   suggesting, by the server, the user based on the one or more desired attributes at a particular point in time.

9. A system comprising:
   a server configured to:
      collect a first set of data generated from a plurality of interactions between a plurality of users and a graphical user interface, wherein the graphical user interface is displayed by the server, on a plurality of computing devices operated by at least one user from the plurality of users, wherein the plurality of user interactions comprise social network chats associated with the plurality of users;
      tag and index the data in a database generated from the plurality of interactions to identify attributes of the data;
      transmit and store the tagged and indexed data generated from the plurality of interactions to the database;
      receive a second set of data from a plurality of external sources comprising at least a social networking source, wherein the second set of data corresponds to at least one user of the plurality of users;
      store the second set of data in the database;
      determine a selection of the plurality of users by:
         comparing the set of user attributes against a set of one or more task attributes associated with a task, wherein the task is related to a project, comparing the set of user attributes against a set of one or more project team attributes that are associated with a project team working on the project, and selecting the subset of users based on each user having a pre-determined attribute;

instruct, by the server, a computing device of the plurality of computing devices to display on the graphical user interface the selection of the plurality of users, wherein attributes of each of the users within the selection of plurality of users matches at least one attribute of associated with the task or the project team working on the project;

generate, by the server, a new graphical user interface configured for display on a plurality of computing devices corresponding to each user within the selection of the plurality of users, the new graphical user interface comprising:

a first graphical region displaying a status of the project, a second graphical region displaying one or recommended users for the project, and a third graphical region displaying one or more selectable graphical components representing one or more terms associated with the project, whereby when the user interacts with a selectable graphical component by clicking on the selectable graphical component, the server launches a display corresponding to a description of the one or more terms associated with the project in accordance with that user's attributes while other selectable graphical components not clicked on by the user remain unlaunched, wherein the one or more selectable graphical components are unique to each user of the subset of the plurality of users.

10. The system according to claim 9, wherein the server is configured to automatically detects the task based on a user interaction with the graphical user interface.

11. The system according to claim 9, wherein the server is configured to compare one or more task attributes associated with the task with the user attributes of each user and suggests at least one user based on matching probabilities.

12. The system according to claim 11, wherein the server is configured to:

suggest one or more users based on a vector representation of the one or more user attributes associated with the plurality of users.

13. The method according to claim 9, wherein the selection of the subset of the plurality of users is based on at least one of: relevance to one or more subject matter, degree of creativity, legal requirements, frequency of use, ratings, related objects, and time-relevance.

14. The system according to claim 9, wherein the database base stores one or more users attributes associated with one or more users from the selection of the plurality of users.

15. The system according to claim 14, wherein the server automatically updates one or more user attributes based on that user interacting with the user interface.

16. The system according to claim 14, further comprising:

a future attributes store storing one or more desired future attributes, wherein the server suggests one or more users associated with a set of desired user attributes at a predetermined time.

17. The system according to claim 14, wherein the selection of the plurality of users are selected based on at least one of behavior of a user in a previous task, user management of conflict, user management of risk, and user capability to obtain insight from other users.

18. The system according to claim 9, wherein the server calculates a score for each of the user attributes of each user based on matching probabilities to each of the task attributes.

* * * * *